United States Patent
Wang et al.

(10) Patent No.: US 11,799,784 B2
(45) Date of Patent: Oct. 24, 2023

(54) VIRTUALIZED QOS SUPPORT IN SOFTWARE DEFINED NETWORKS

(71) Applicant: VMware, Inc., Palo Alto, CA (US)

(72) Inventors: Dexiang Wang, Sunnyvale, CA (US); Sreeram Kumar Ravinoothala, San Jose, CA (US); Yong Wang, Sunnyvale, CA (US); Jerome Catrouillet, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 15 days.

(21) Appl. No.: 17/569,276

(22) Filed: Jan. 5, 2022

(65) Prior Publication Data
US 2022/0393983 A1  Dec. 8, 2022

Related U.S. Application Data (60) Provisional application No. 63/208,394, filed on Jun. 8, 2021.

(51) Int. Cl.
| | | |
|---|---|---|
| H04L 47/2416 | (2022.01) | |
| H04L 47/2425 | (2022.01) | |
| H04L 43/0888 | (2022.01) | |
| H04L 47/122 | (2022.01) | |

(Continued)

(52) U.S. Cl.
CPC ...... *H04L 47/2416* (2013.01); *H04L 43/0888* (2013.01); *H04L 47/122* (2013.01); *H04L 47/125* (2013.01); *H04L 47/2433* (2013.01); *H04L 47/781* (2013.01)

(58) Field of Classification Search
None
See application file for complete search history.

(56) References Cited

U.S. PATENT DOCUMENTS

| | | |
|---|---|---|
| 7,516,487 B1 | 4/2009 | Szeto et al. |
| 7,734,895 B1 | 6/2010 | Agarwal et al. |
| 8,509,068 B2 | 8/2013 | Begall et al. |

(Continued)

FOREIGN PATENT DOCUMENTS

| | | |
|---|---|---|
| CN | 106059960 A | 10/2016 |
| CN | 109547502 A | 3/2019 |

OTHER PUBLICATIONS

Non-Published Commonly Owned U.S. Appl. No. 17/971,591, filed Oct. 22, 2022, 45 pages, VMware, Inc.

(Continued)

*Primary Examiner* — Andre Tacdiran
(74) *Attorney, Agent, or Firm* — ADELI LLP (57) ABSTRACT

A network system that implements quality of service (QoS) by rate limiting at a logical network entity is provided. The logical network entity includes multiple transport nodes for transporting network traffic in and out of the logical network entity. The system monitors traffic loads of the multiple transport nodes of the logical network entity. The system allocates a local CR and a local BS to each of the multiple transport nodes. The allocated local CR and the local BS are determined based on the CR and BS parameters of the logical network entity and based on the monitored traffic loads. Each transport node of the logical network entity in turn controls an amount of data being processed by the transport node based on a token bucket value that is computed based on the local CR and the local BS of the transport node.

20 Claims, 8 Drawing Sheets

(51) Int. Cl.
*H04L 47/78* (2022.01)
*H04L 47/125* (2022.01)

(56) References Cited

U.S. PATENT DOCUMENTS

| | | | |
|---|---|---|---|
| 9,378,049 B1* | 6/2016 | Johnson | G06F 9/45558 |
| 9,942,144 B1 | 4/2018 | Ramalingam et al. | |
| 10,778,721 B1 | 9/2020 | Holbrook et al. | |
| 10,833,992 B1 | 11/2020 | Dickinson | |
| 10,880,121 B1 | 12/2020 | Nirmala et al. | |
| 10,897,420 B1 | 1/2021 | Pianigiani et al. | |
| 11,483,246 B2 | 10/2022 | Wang et al. | |
| 11,539,633 B2 | 12/2022 | Wang et al. | |
| 2003/0081546 A1* | 5/2003 | Agrawal | H04L 47/50 |
| | | | 370/412 |
| 2005/0066166 A1 | 3/2005 | Chin et al. | |
| 2007/0253439 A1* | 11/2007 | Iny | H04L 49/3045 |
| | | | 370/413 |
| 2008/0222730 A1 | 9/2008 | Ford et al. | |
| 2009/0016336 A1 | 1/2009 | LaVigne et al. | |
| 2009/0119750 A1 | 5/2009 | Sembugamoorthy et al. | |
| 2009/0129271 A1 | 5/2009 | Ramankutty et al. | |
| 2009/0161682 A1 | 6/2009 | Johnson et al. | |
| 2009/0300759 A1 | 12/2009 | Wang et al. | |
| 2010/0135287 A1 | 6/2010 | Hosain et al. | |
| 2011/0176418 A1* | 7/2011 | Gershinsky | H04L 47/22 |
| | | | 370/230.1 |
| 2012/0051218 A1 | 3/2012 | Mohandoss et al. | |
| 2012/0081580 A1 | 4/2012 | Côté et al. | |
| 2013/0058229 A1 | 3/2013 | Casado et al. | |
| 2013/0125120 A1 | 5/2013 | Zhang et al. | |
| 2014/0052877 A1 | 2/2014 | Mao | |
| 2014/0153422 A1 | 6/2014 | Nambiar et al. | |
| 2014/0156720 A1 | 6/2014 | Janakiraman et al. | |
| 2015/0016286 A1 | 1/2015 | Ganichev et al. | |
| 2015/0016469 A1 | 1/2015 | Ganichev et al. | |
| 2015/0113133 A1 | 4/2015 | Srinivas et al. | |
| 2015/0244630 A1 | 8/2015 | Madem et al. | |
| 2015/0256466 A1* | 9/2015 | Roitshtein | H04L 47/2483 |
| | | | 709/234 |
| 2015/0263899 A1 | 9/2015 | Tubaltsev et al. | |
| 2015/0281277 A1 | 10/2015 | May et al. | |
| 2016/0014634 A1* | 1/2016 | Liu | H04W 24/08 |
| | | | 370/232 |
| 2016/0057166 A1 | 2/2016 | Chesla | |
| 2016/0080211 A1 | 3/2016 | Anand et al. | |
| 2016/0105333 A1* | 4/2016 | Lenglet | H04L 43/20 |
| | | | 370/252 |
| 2016/0164910 A1 | 6/2016 | Tang | |
| 2016/0182255 A1* | 6/2016 | Liu | H04L 12/465 |
| | | | 370/254 |
| 2016/0218918 A1 | 7/2016 | Chu et al. | |
| 2017/0118042 A1 | 4/2017 | Bhattacharya et al. | |
| 2017/0149648 A1 | 5/2017 | Yang et al. | |
| 2018/0091547 A1 | 3/2018 | Pierre | |
| 2018/0157515 A1 | 6/2018 | Malloy et al. | |
| 2018/0176181 A1 | 6/2018 | Fu et al. | |
| 2018/0262599 A1 | 9/2018 | Firestone | |
| 2018/0279161 A1 | 9/2018 | Chen et al. | |
| 2018/0285151 A1 | 10/2018 | Wang et al. | |
| 2018/0309640 A1 | 10/2018 | Nagarajan et al. | |
| 2018/0359134 A1 | 12/2018 | Pech et al. | |
| 2019/0007330 A1 | 1/2019 | Browne et al. | |
| 2019/0014051 A1 | 1/2019 | Briscoe et al. | |
| 2019/0044809 A1 | 2/2019 | Willis et al. | |
| 2019/0081899 A1 | 3/2019 | Mundkur et al. | |
| 2019/0108068 A1 | 4/2019 | Britkin et al. | |
| 2019/0182367 A1 | 6/2019 | Kim et al. | |
| 2019/0334868 A1 | 10/2019 | Tewari et al. | |
| 2020/0278892 A1 | 9/2020 | Nainar et al. | |
| 2020/0413283 A1 | 12/2020 | Shen et al. | |
| 2021/0067489 A1 | 3/2021 | Jayawardena et al. | |
| 2021/0176168 A1 | 6/2021 | Eckert et al. | |
| 2021/0218677 A1 | 7/2021 | Wang et al. | |
| 2021/0227424 A1 | 7/2021 | Wang et al. | |
| 2021/0255903 A1 | 8/2021 | Wang et al. | |
| 2021/0399920 A1 | 12/2021 | Sundararajan et al. | |
| 2022/0070102 A1 | 3/2022 | Wang et al. | |
| 2022/0158922 A1* | 5/2022 | Srivastava | H04L 49/351 |
| 2022/0264360 A1* | 8/2022 | Chen | H04W 28/0289 |

OTHER PUBLICATIONS

Non-Published Commonly Owned U.S. Appl. No. 18/088,562, filed Dec. 24, 2022, 43 pages, VMware, Inc.

Seddiki, M. Said, et al., "FlowQoS: QoS for the Rest of US," HotSDN '14, Aug. 22, 2014, 2 pages, ACM, Chicago, IL, USA.

* cited by examiner

VIRTUALIZED QOS SUPPORT IN SOFTWARE DEFINED NETWORKS

BACKGROUND

Quality of service (QoS) mechanisms are important in datacenters in order to guarantee contracted-for levels of performance. However, rate-limiting mechanisms are generally performed in hardware (e.g., at the network interface controller (NIC) level), which aggregates all tenants of a datacenter together. Traffic is typically tenant-independent at the hardware level, and therefore difficult to disaggregate.

BRIEF SUMMARY

Some embodiments of the invention provide a network system that implements QoS by rate limiting at a logical network entity. The logical network entity is virtualized over multiple transport nodes. The system monitors traffic loads of the multiple transport nodes of the logical network entity. The system allocates a local committed rate (CR) and a local burst size (BS) to each of the multiple transport nodes. The allocated local CR and the local BS are determined based on the CR and BS parameters of the logical network entity and based on the monitored traffic loads. Each transport node of the logical network entity in turn controls an amount of data being processed by the transport node based on a token bucket value that is computed based on the local CR and the local BS of the transport node.

In some embodiments, a central control plane (CCP) node of a logical network that includes the logical network entity specifies the QoS requirement in terms of the CR parameter and the BS parameter. The CCP node also monitors the traffic loads of the multiple transport nodes and allocates the local CR and the local BS to each of the transport nodes based on the CR and BS parameters of the logical network entity and the monitored traffic loads.

In some embodiments, the multiple transport nodes include one or more edge nodes that control network traffic to and from a network (N-S traffic). In some embodiments, the multiple transport nodes include one or more managed forwarding elements in the logical network. In some embodiments, the managed forwarding elements are implemented by virtualization software running in different host computing devices in multiple different public cloud datacenters, and the logical network may also span multiple public cloud datacenters.

In some embodiments, the CR and the BS of the logical network entity are determined according to a QoS policy of the logical network entity. In some embodiments, the CCP node maintains a QoS data structure of the logical network entity that includes the CR and the BS of the logical network entity. In some embodiments, the QoS data structure also includes the local CR and the local BS of each transport node.

In some embodiments, the CCP node allocates the CR and the BS evenly among the transport nodes prior to monitoring the traffic loads of the transport nodes. In some embodiments, the CCP node monitors the traffic load of the logical network entity by periodically collecting traffic load information from each transport node to obtain the traffic load distribution of the logical network.

In some embodiments, each transport node has a local token value that specifies a current amount of data that can be processed for the transport node. Each transport node controls the amount of data being processed by the transport node by (i) adding to the local token value of the transport node an amount of data allowed to be processed by the transport node during a monitoring interval based on the local CR (e.g., local CR multiplied by a monitoring time interval) and (ii) subtracting from the local token value of the transport node an amount of data already processed by the transport node. The amount of data allowed to be processed by the transport node (i.e., the local token value) is capped according to the local BS parameter.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, the Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for applying a quality of service (QoS) policy on a logical network entity. Such a logical network entity is realized on or virtualized over a set of transport nodes such as edges and hypervisors (and denoted as T1, ..., Tn). The traffic that traverses through such a logical network entity is subject to a rate limiting process, and the traffic being processed by the different transport nodes (T1, ..., Tn) of the logical network entity are rate limited according to the QoS policy being applied to the logical network entity. The transport nodes involved in implementing the logical network entity function jointly to provide such rate limiting functionality. For example, a QoS requirement may be defined for a distributed router in an overlay (logical) network, and the host machines used to implement the edges and hypervisors of the distributed router may jointly operate in the same QoS policy context as transport nodes of the logical network entity. In some embodiments, a rate-limited logical network entity may have transport nodes that are edges for handling N-S traffic of an overlay network. In some embodiments, a rate-limited logical network entity may have transport nodes that are hypervisors and edges for handling E-W traffic of an overlay network.

Figure 1:
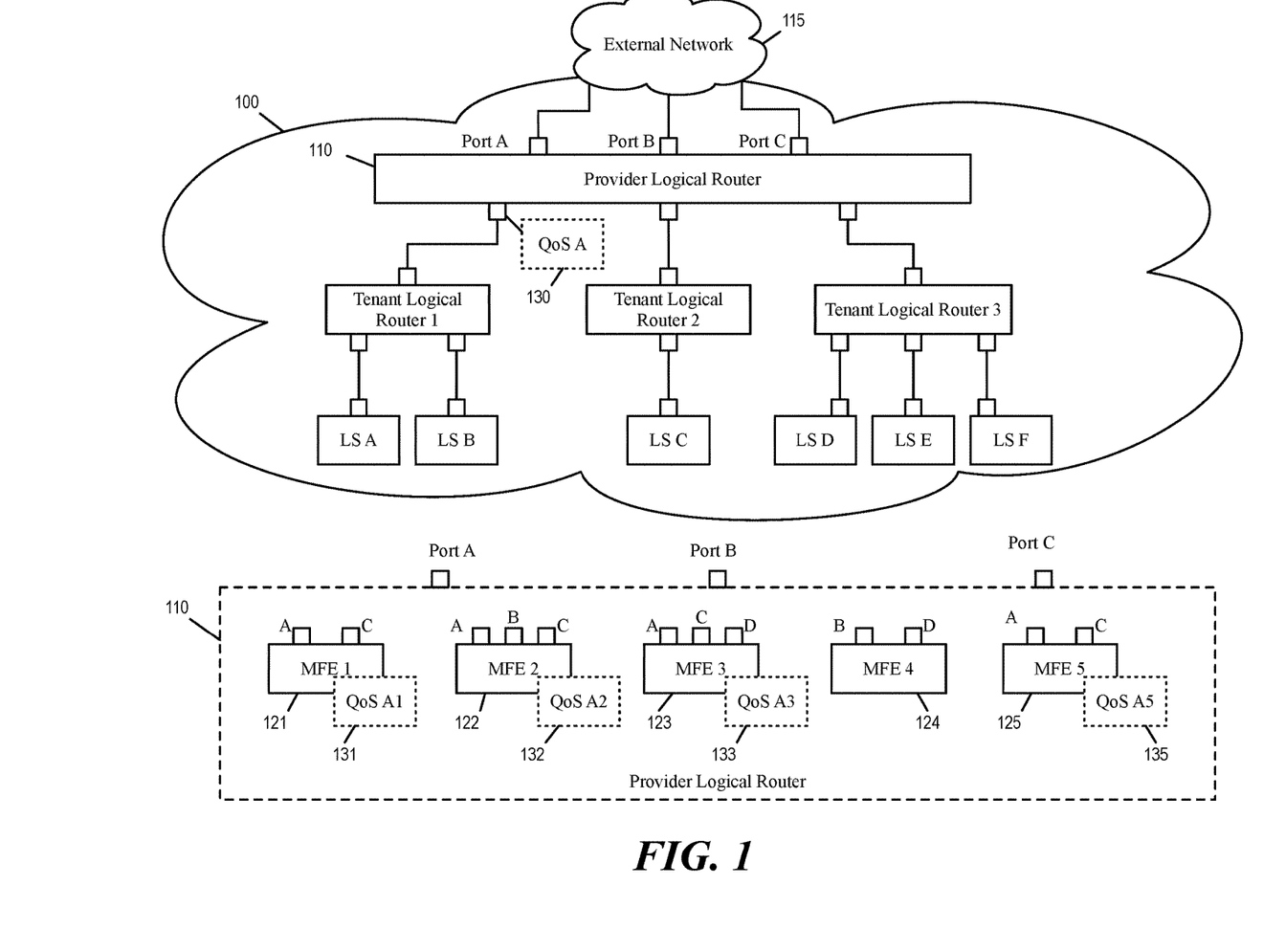
FIG. 1 conceptually illustrates the QoS policy of a logical network entity being applied to transport nodes that are used to implement the logical network entity.

FIG. 1 conceptually illustrates the QoS policy of a logical network entity being applied to transport nodes that are used to implement the logical network entity. The figure illustrates an overlay or logical network 100 that is implemented by host machines in one or more datacenters. The overlay or logical network 100 has a provider logical router 110. The provider logical router 110 has at least three router ports (Port A, Port B, and Port C) to an external network 115 (e.g., Internet). The provider logical router 110 is a distributed router that spans multiple tenant logic routers for different tenants (tenants 1, 2, and 3), and each tenant logic router in turn spans one or more logical switches. The various logical routers and logical switches are implemented by managed forwarding elements (MFEs), which are logical entities for transporting network traffic. The MFEs are implemented by virtualization software running in one or more host machines that are provided by one or more datacenters. MFEs and virtualization software will be further described by reference to FIG. 7 below.

The provider logical router 110 is implemented by several MFEs 121-125, and each of the three router ports (Ports A, B, and C) of the provider logical router 110 spans at least some of the MFEs 121-125. In other words, each MFE 121-125 may implement logical or virtual ports that correspond to some of the router ports of the provider logical router 110. In the example illustrated, MFEs 121, 122, 123, and 125 each implement a virtual port that corresponds to Port A of the provider logical router 110.

A distributed logical router port can be a logical network entity upon which a QoS policy is applied. A distributed logical router port is a logical port that can be realized on different transport nodes as defined by the span of the distributed router. Accordingly, all transport nodes involved in implementing the distributed logical router port jointly operate on the QoS policy to enforce rate limiting across those nodes. In the example of FIG. 1, a QoS policy 130 (QoS A) is applied to Port A, which is a distributed logical router port that spans MFEs 121, 122, 123, and 125. Thus, the MFEs 121, 122, 123, and 125 are transport nodes involved with the logical network entity Port A, and these MFEs (as transport nodes of the logical network entity) jointly enforce the QoS policy 130 by performing rate limiting locally at each MFE (conceptually illustrated as local QoS policies 131, 132, 133, and 135).

In some embodiments, a QoS policy is applied to the logical entity based on token-bucket-value-based rate limiting. Namely, the logical entity is permitted to process traffic only if a token bucket value of the logical entity indicates that the logical network entity has a sufficient budget to process additional data (e.g., when the token bucket value is non-zero or greater than a threshold.) This token bucket value is computed according to the QoS policy applied to the logical network entity. In some embodiments, the token bucket value is computed according to at least two parameters: a committed rate (CR) and a burst size (BS). In other words, the token bucket value of a logical network entity has a CR parameter and a BS parameter that are defined according to the QoS of the logical network entity. As the logical network entity is processing a data or traffic load, the amount of data being processed by the logical network entity is subtracted from the token bucket value, while the amount of data that the logical network entity is permitted to process during a time interval (i.e., the CR parameter multiplied by the time interval) is added to the token bucket value. This addition is limited by the BS parameter, which places a cap on the burst token value (such that the token value can never be set larger than the BS parameter). The subtraction is limited such that the token value does not drop below zero. The logical entity is permitted to process the traffic load only if the token bucket value indicates a sufficient budget (e.g., greater than zero or a threshold) for processing additional data.

In some embodiments, for transport nodes that are involved with (or are used to implement) the logical network entity, the CR and BS of the logical network entity may be distributed among the involved transport nodes such that each transport node is allocated a local CR and a local BS. Each transport node in turn updates its local token bucket value based on the transport node's allocated local CR and local BS.

Figure 2:
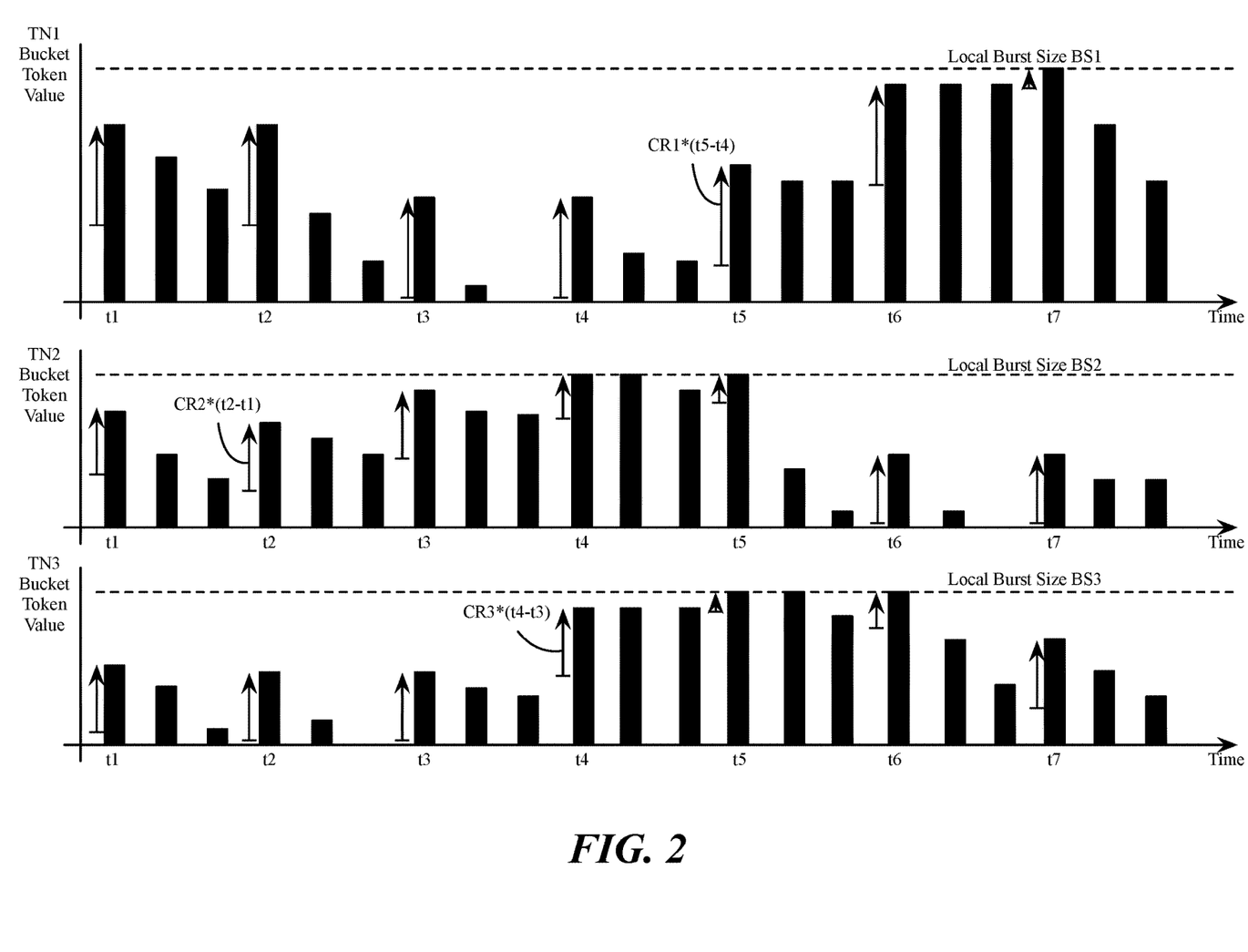
FIG. 2 shows different transport nodes of a logical network entity using their respective local token buckets for rate limiting.

FIG. 2 shows different transport nodes of a logical network entity using their respective local token buckets for rate limiting. As each transport node is processing data or traffic load, the amount of data being processed by the transport node is subtracted from the token bucket value, while the amount of data that the transport node is permitted to process during a time interval (i.e., the local CR parameter multiplied by the time interval) is added to the local token bucket value. This addition is limited by the local BS parameter, which places a cap on the burst token value (such that the local token bucket value can never exceed the local BS parameter). The subtraction is limited such that the local bucket token value does not drop below zero. Each transport node is permitted to process a traffic load only if the local token bucket value of the transport node indicates sufficient budget (e.g., greater than zero or a threshold) for processing additional data.

The figure shows three transport nodes (TN1, TN2, and TN3) of a logical network entity updating their respective local token bucket value based on their respective local CR and BS parameters. As the transport nodes TN1, TN2, and TN3 process their respective traffic load, their respective local token bucket values decrease. The local token bucket value of each transport node is replenished periodically based on the transport node's local CR parameter, e.g., at time instances t1, t2, t3, t4, t5, t6, etc. For example, at time t5, the local bucket token value of TN1 is increased by CR1*(t5−t4) (i.e., the local CR parameter of TN1 multiplied by a time interval since t4, which is the last replenishment into the local bucket token value of TN1.) Moreover, the replenishment of the local token bucket value of each transport node is constrained by the local BS parameter of the transport node. For example, though at time instances t5 and t6 the local token bucket value of TN2 is replenished, the value is capped by BS2 (or BS parameter of TN2).

In some embodiments, a central appliance in the control plane of the network is used to coordinate all transport nodes (T1, . . . , Tn) to facilitate the rate-limiting operations. An example of such a control plane central appliance is a central control plane (CCP) node in a datacenter that runs VMware's NSX-T. In some embodiments, the CCP node controlling the rate-limiting operations of a logical network entity maintains a QoS data structure for the logical network entity. The QoS data structure stores the CR and BS of the logical network entity that are specified based on the QoS policy of the logical network entity. The QoS data structure also stores the allocated local CR and BS parameters of each transport node involved with the logical network entity. In some embodiments, the CCP node monitors the traffic load at the different transport nodes and makes adjustments to the allocation of local CR and BS parameters of the involved transport nodes based on traffic load data collected from the different transport nodes. Specifically, the CCP node periodically (e.g., at the end of every monitoring interval) collects traffic load distribution from the transport nodes, then computes and sends the local CR and the local BS for each transport node.

In some embodiments, at the beginning of the QoS-based rate-limiting operation, the logical network entity's token bucket (and its corresponding CR and BS) is evenly distributed among the involved transport nodes such that if there are n involved transport nodes, each transport node is assigned a local committed rate=CR/n and a local burst size=BS/n. Each transport node involved with the logical network entity then monitors the local traffic load of the transport node at run-time, as the traffic load is being rate limited by the QoS policy (in terms of bytes per second). After a certain monitoring interval, some or all of the involved transport nodes will have their allocated local CR and BS adjusted based on the monitored traffic load. Each transport node in turn reports its run-time monitored traffic load to the CCP node, and the CCP node makes adjustments to the allocated local CR and BS parameters of the transport nodes based on traffic loads of the different transport nodes that are reported or collected in this time interval.

Let R1, . . . , Rn respectively represent the traffic load at different transport nodes T1, . . . , Tn. In some embodiments, the adjusted local committed rate for a transport node i is calculated as $CRi=CR*(Ri/(R1+ \ldots +Rn))$. Likewise, the adjusted local burst size for a transport node i is calculated as $BSi=BS*(Ri/(R1+ \ldots +Rn))$. In other words, both the local committed rate and the local burst size are adjusted based on a percentage of the total traffic load of the logical network entity that is the traffic load of the transport node i. Hence the transport nodes are jointly providing the committed rate and burst size for the QoS token bucket of the logical network entity as a whole. The advantage of this solution is that the local token buckets adapt their capacity based on run-time traffic load distribution. When the traffic distribution is skewed towards certain transport nodes, the above adjustment mechanism allocates higher bucket capacity to those transport nodes.

Figure 3A:
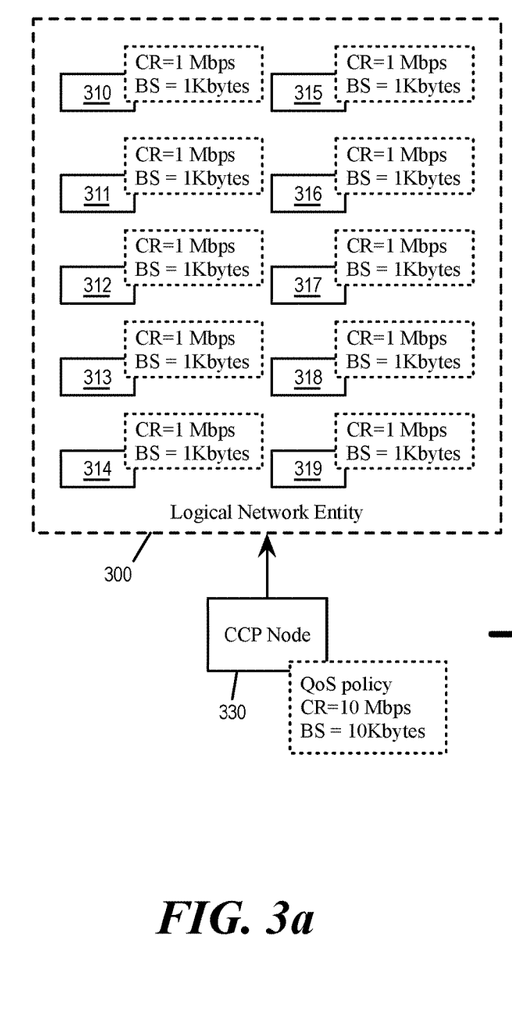
FIGS. 3a-c illustrate the adjustment of local token buckets of transport nodes of a logical network entity based on monitoring traffic loads of the transport nodes.
Figure 3B:
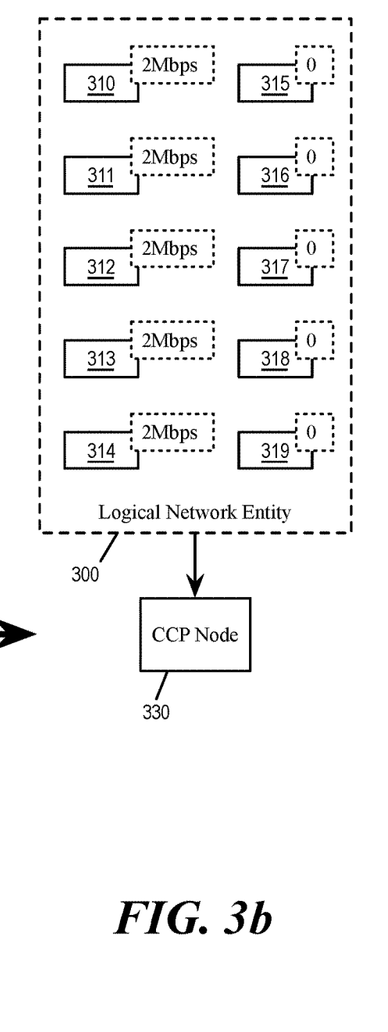
Figure 3C:
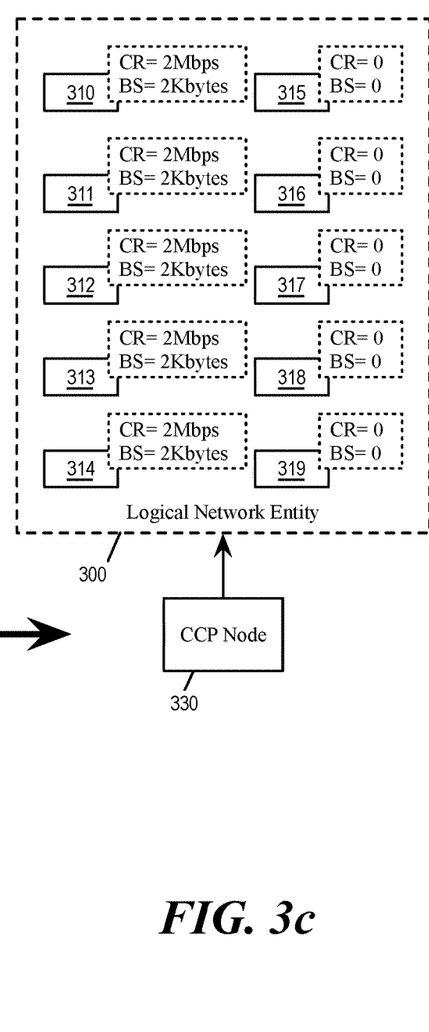

FIGS. 3a-c illustrate the adjustment of local token buckets of transport nodes of a logical network entity 300 based on monitoring traffic loads of the transport nodes. The logical network entity 300 has ten transport nodes 310-319 that are involved in processing a QoS policy. The total committed rate and burst size for the logical network entity 300 according to the QoS policy are 10 Mbps and 10000 bytes, respectively. FIG. 3a shows a CCP node 330 initially allocates 1 Mbps committed rate and 1000-byte burst size to each of the transport nodes 310-319.

FIG. 3b shows that, at a first monitoring interval, the traffic loads of the transport nodes 310-319 are monitored to be 2 Mbps, 2 Mbps, 2 Mbps, 2 Mbps, 2 Mbps, 0 Mbps, 0 Mbps, 0 Mbps, 0 Mbps, 0 Mbps, respectively. During that interval, the traffic of the transport nodes 310-314 are limited by their allocated local committed rates and burst sizes, while the transport nodes 315-319 have no traffic load. At the end of the first monitoring interval, the CCP node 330 collects the traffic load distribution data from the transport nodes 310-319 and adjusts the allocated or local committed rates and burst sizes of the transport nodes 310-319 based on the collected traffic load distribution.

FIG. 3c shows that the CCP node 330 adjusted the distribution or allocation of the CR and BS parameters. Specifically, the transport nodes 310-314 are respectively allocated local committed rates 2 Mbps, 2 Mbps, 2 Mbps, 2 Mbps, 2 Mbps, while the transport nodes 315-319 are respectively allocated local committed rates 0 Mbps, 0 Mbps, 0 Mbps, 0 Mbps, 0 Mbps. If the traffic distribution stays stable over a period of time, the adjusted token buckets of the different transport nodes can well serve such traffic distribution. Once the load distribution changes again, the CCP node 330 will adjust the token bucket allocation accordingly.

In some embodiments, the CCP node is selected from a cluster of CCP nodes (usually a cluster of 3), and a sharding mechanism is applied across different QoS policies supported in the system (the NSX-T network) to load balance the tasks of coordinating transport nodes. In some embodiments, the logical network entity being rate limited according to a particular QoS policy is in a virtualized shard associated with the particular QoS policy, where different virtualized shards support different QoS policies or classes.

Figure 4:
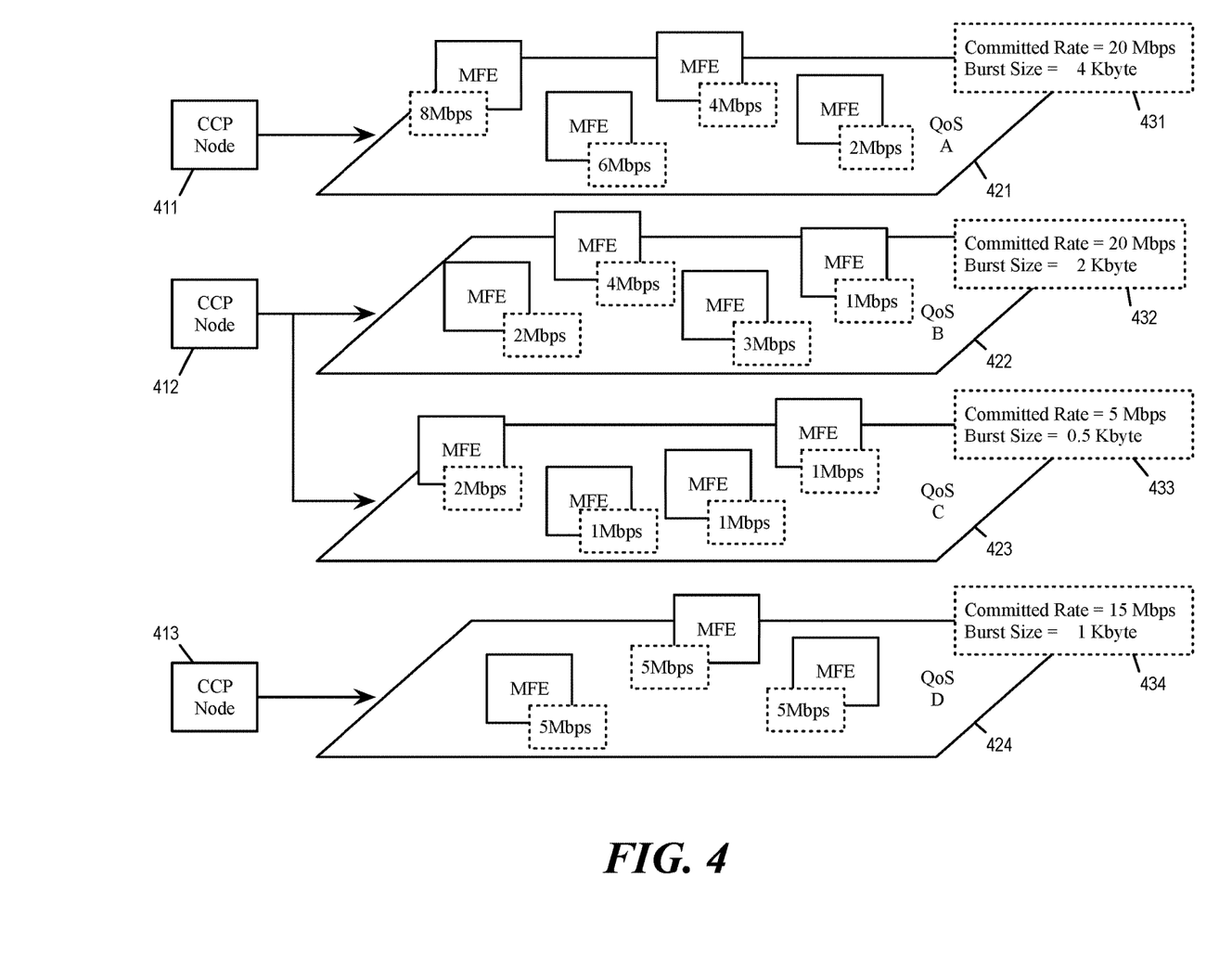
FIG. 4 illustrates a network system in which different CCP nodes of a cluster are tasked with coordinating transport nodes to implement different QoS policies for different logical network entities.

FIG. 4 illustrates a network system in which different CCP nodes of a cluster are tasked with coordinating transport nodes to implement different QoS policies for different logical network entities.

As illustrated, a CCP cluster includes CCP nodes 411, 412, and 413 that are sharing the task of coordinating transport nodes for implementing QoS policies in different logical network entities. The CCP node 411 is coordinating the transport nodes of a logical network entity 421 to implement a QoS policy 431 (QoS A in terms of committed rate and burst size). The CCP node 412 is coordinating transport nodes of a logical network entity 422 to implement a QoS policy 432 (QoS B) and also transport nodes of a logical network entity 423 to implement a QoS policy 433 (QoS C). The CCP node 413 is coordinating the transport nodes of a logical network entity 424 to implement a QoS policy 434 (QoS D).

Figure 5:
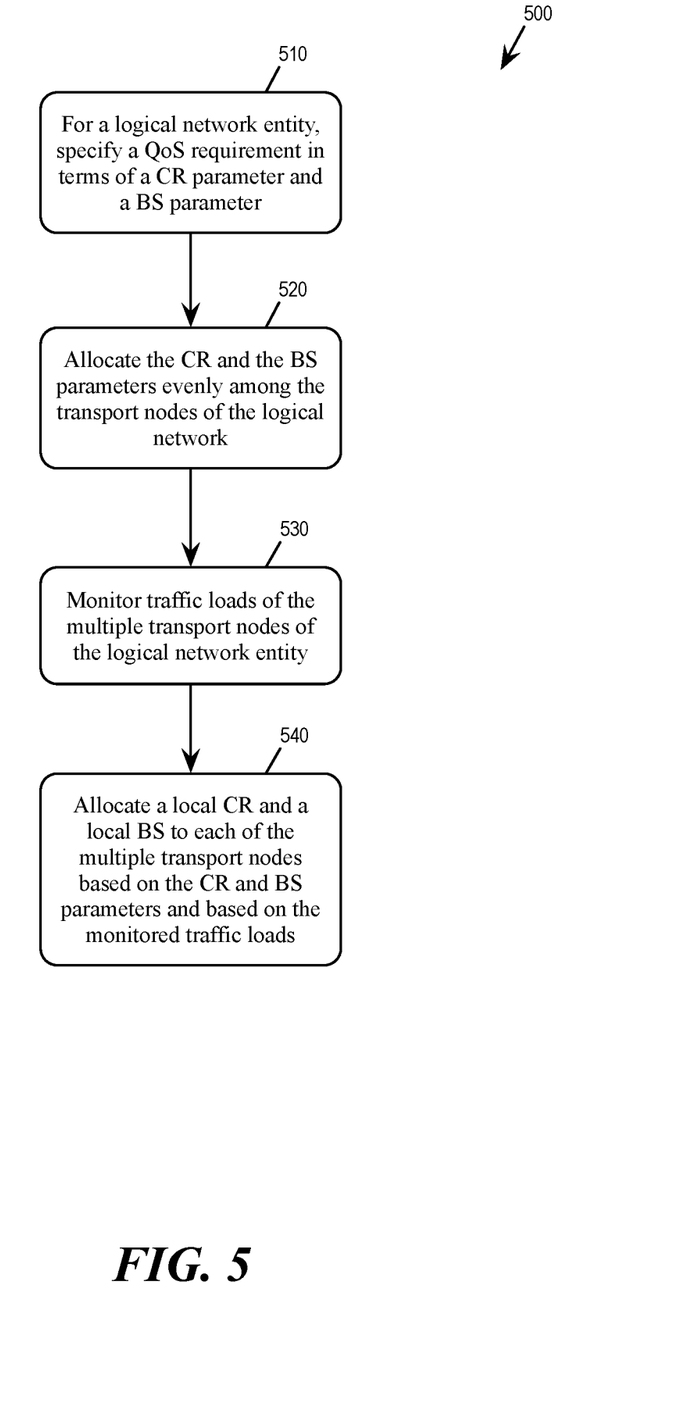
FIG. 5 conceptually illustrates a process for implementing QoS rate limiting at a logical network entity that is virtualized over multiple transport nodes.

For some embodiments, FIG. 5 conceptually illustrates a process 500 for implementing QoS rate limiting at a logical network entity that is virtualized over multiple transport nodes. In some embodiments, one or more processing units (e.g., processor) of a computing device implementing a control plane node (e.g., the CCP node 330) of a logical network that includes the logical network entity perform the process 500 by executing instructions stored in a computer-readable medium. The logical network entity includes multiple transport nodes that process the network traffic of the logical network entity. In some embodiments, the multiple transport nodes include one or more edge nodes that control network traffic to and from a network (N-S traffic). In some embodiments, the multiple transport nodes include one or more managed forwarding elements in the logical network.

In some embodiments, the managed forwarding elements are implemented by virtualization software running in different host computing devices in multiple different public cloud datacenters, and the logical network may also span multiple public cloud datacenters.

The process 500 starts when the CCP node specifies (at 510) a quality of service (QoS) requirement in terms of a committed rate (CR) parameter and a burst size (BS) parameter. In some embodiments, the CR and the BS of the logical network entity are determined according to a QoS policy of the logical network entity. In some embodiments, the CCP node maintains a QoS data structure of the logical network entity that includes the CR and the BS of the logical network entity.

The CCP node allocates (at 520) the CR and the BS of the logical network entity evenly among the transport nodes of the logical network entity as the local CR and local BS of each transport node. The CCP node monitors (at 530) monitors traffic loads of the plurality of transport nodes of the logical network entity. In some embodiments, the CCP node allocates the CR and BS evenly among the transport nodes prior to monitoring the traffic loads of the transport nodes. In some embodiments, the QoS data structure also includes the local CR and the local BS of each transport node. In some embodiments, the CCP node monitors the traffic load of the logical network entity by periodically collecting traffic load information from each transport node to obtain the traffic load distribution of the logical network.

The CCP node allocates (at 540) a local CR and a local BS to each of the plurality of transport nodes. The allocated local CR and the local BS are determined based on the CR and BS parameters of the logical network entity and based on the monitored traffic loads. For example, in some embodiments, the CCP node adjusts the local CR and BS parameters of a transport node based on a percentage of the total traffic load of the logical network entity that is the traffic load of the transport node.

Each transport node of the logical network entity in turn controls an amount of data being processed by the transport node based on a token bucket value that is computed based on the local CR and the local BS of the transport node. Each transport node has a local token value that specifies a current amount of data that can be processed for the transport node, and each transport node controls the amount of data being processed by the transport node by (i) adding to the local token value of the transport node an amount of data allowed to be processed by the transport node during a monitoring interval based on the local CR (e.g., local CR multiplied by a monitoring time interval) and (ii) subtracting from the local token value of the transport node an amount of data already processed by the transport node. The amount of data allowed to be processed by the transport node (i.e., the local token value) is capped according to the local BS parameter.

Figure 6:
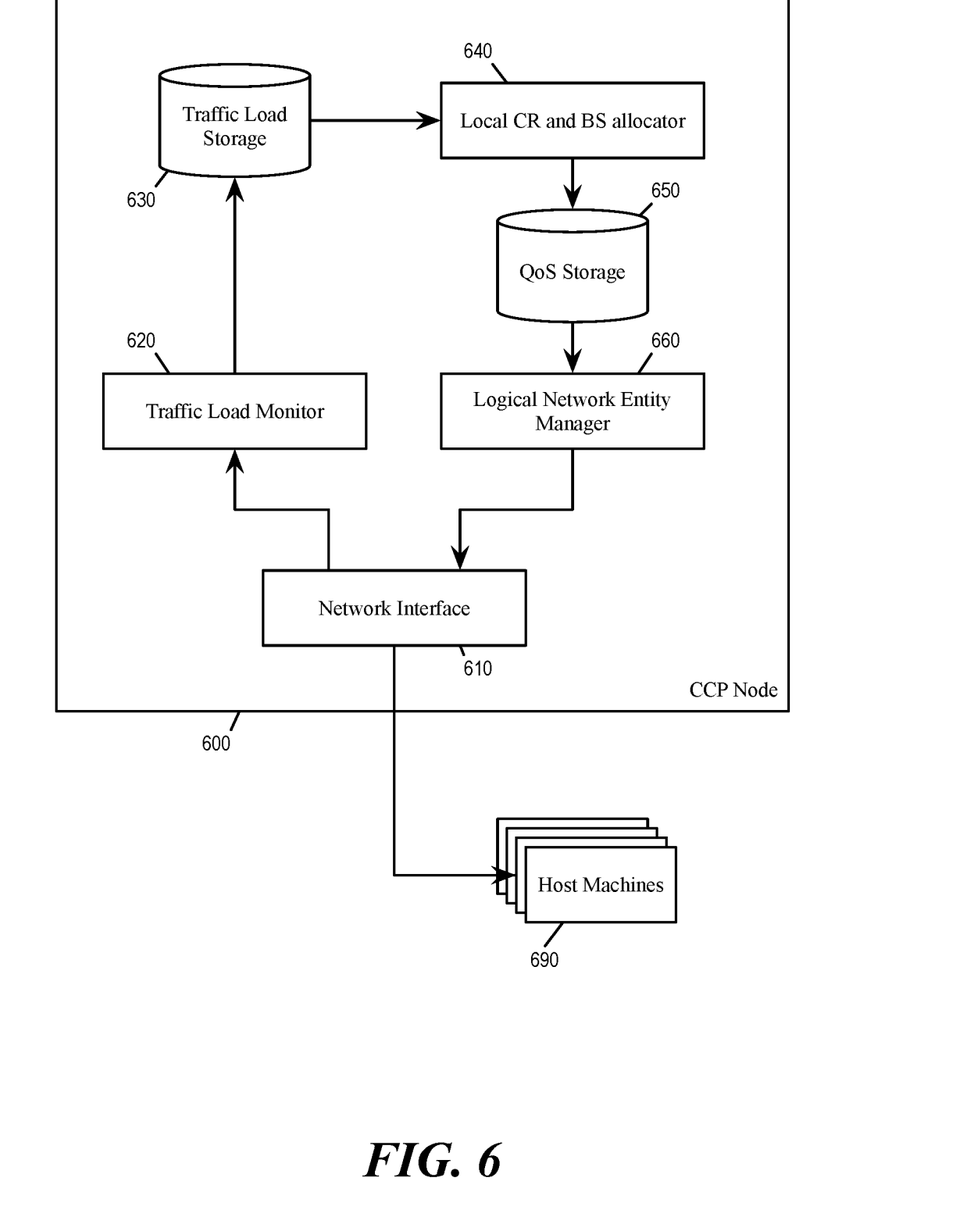
FIG. 6 illustrates a block diagram of a CCP node that implements QoS at a logical network entity by rate limiting transport nodes of the logical network entity.

FIG. 6 illustrates a block diagram of a central control plane (CCP) node 600 that implements QoS at a logical network entity by rate limiting transport nodes of the logical network entity. The CCP node 600 may be implemented by a bare metal computing device or a host machine running virtualization software that operates the CCP node 600 in one or more virtual machines or data compute nodes (DCNs).

As illustrated, the CCP node 600 implements a network interface 610, a traffic load monitor 620, a traffic load storage 630, a local CR and BS allocator 640, a QoS storage 650, and a logical network entity manager 660. In some embodiments, the modules 610-660 are modules of software instructions being executed by one or more processing units (e.g., a processor) of a computing device. In some embodiments, the modules 610-660 are modules of hardware circuits implemented by one or more integrated circuits (ICs) of an electronic apparatus. Though the modules 610-660 are illustrated as being separate modules, some of the modules 610-660 can be combined into a single module. For example, the QoS storage 650 and the traffic load storage 630 may be implemented by a same storage module.

The network interface 610 of the CCP node 600 sends data to and receives data from a physical network, through which the CCP node 600 communicates with host machines 690 that implements the logical network entity and its transport nodes. Among the data received by the network interface 610 are traffic load statistics from the various transport nodes, which is identified and collected by the traffic load monitor 620 and stored in the traffic load storage 630.

Based on the traffic load data of the different transport nodes stored in the traffic load storage 630, the local CR and BS allocator 640 assigns local CR and BS parameters to each of the transport nodes based on the CR and BS parameters of the logical network entity, e.g., by adjusting the local CR and BS parameters of a transport node based on a percentage of the total traffic load of the logical network entity that is the load of the transport node. In some embodiments, prior to the traffic load data being available in the traffic load storage 630 (e.g., prior to monitoring the transport nodes), the local CR and BS allocator 640 divides the CR and BS parameters of the logical network entity evenly among the transport nodes as their local CR and BS parameters.

The QoS storage 650 stores the QoS data structures of the logical network entity. The QoS data structure may include the QoS policy, the CR and BS parameters of the logical network entity, and the allocated local CR and BS parameters of the different transport nodes (that are computed by the local CR and BS allocator 640). The logical network entity manager 660 in turn retrieves the allocated local CR and BS parameters for different transport nodes from the QoS storage 650 and transmits the retrieved parameters to the host machine that implements the transport node.

Figure 7:
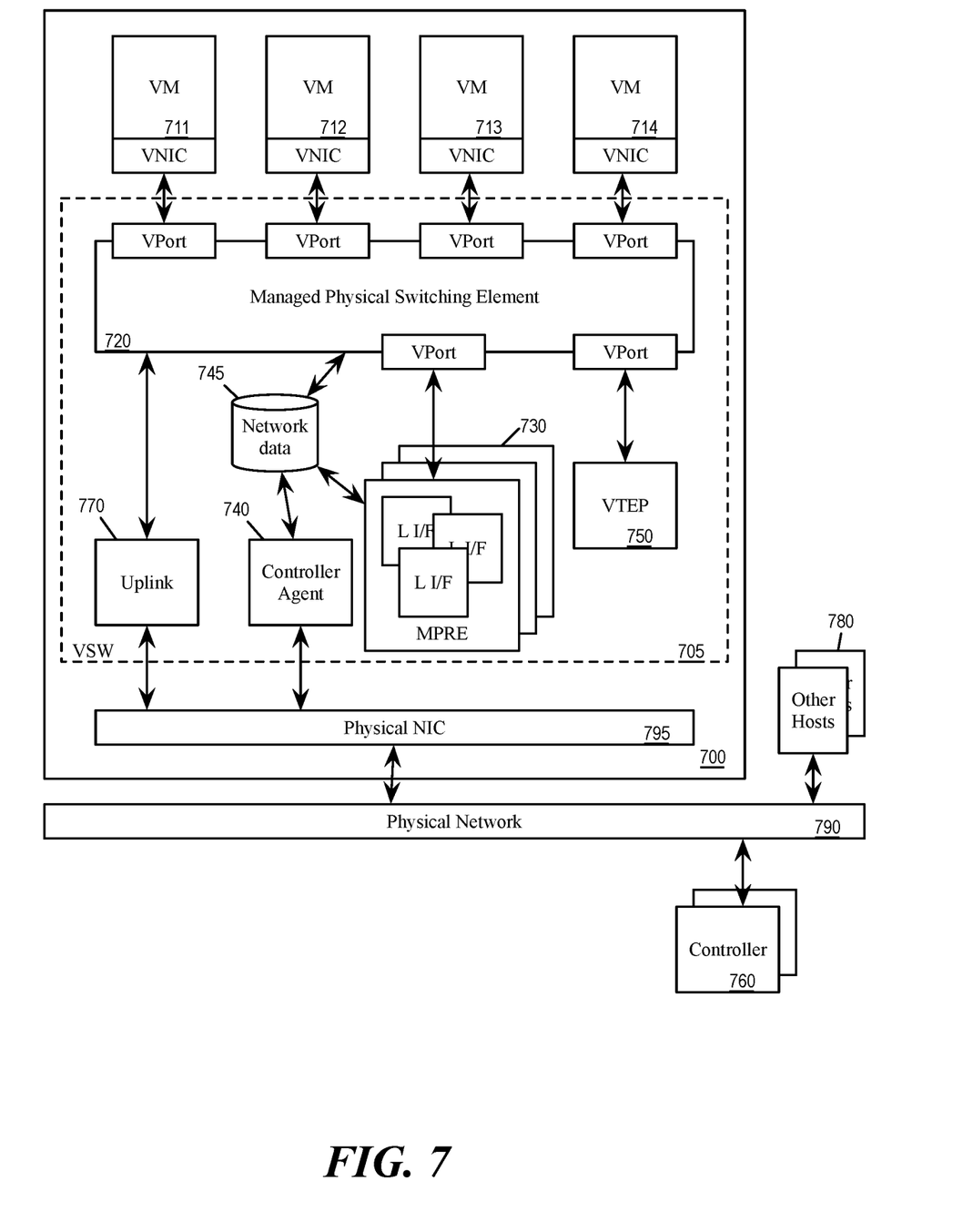
FIG. 7 illustrates a computing device that serves as a host machine that runs virtualization software FIG. 8 conceptually illustrates a computer system with which some embodiments of the invention are implemented.

In some embodiments, one or more transport nodes of the logical network entity may be implemented by a host machine that is running virtualization software, serving as a virtual network forwarding engine. Such a virtual network forwarding engine is also known as managed forwarding element (MFE), or hypervisors. Virtualization software allows a computing device to host a set of virtual machines (VMs) or data compute nodes (DCNs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 7 illustrates a computing device 700 that serves as a host machine that runs virtualization software for some embodiments of the invention.

As illustrated, the computing device 700 has access to a physical network 790 through a physical NIC (PNIC) 795. The host machine 700 also runs the virtualization software 705 and hosts VMs 711-714. The virtualization software 705 serves as the interface between the hosted VMs 711-714 and the physical NIC 795 (as well as other physical resources, such as processors and memory). Each of the VMs 711-714 includes a virtual NIC (VNIC) for accessing the network through the virtualization software 705. Each VNIC in a VM 711-714 is responsible for exchanging packets between the VM 711-714 and the virtualization software 705. In some embodiments, the VNICs are software abstractions of physical NICs implemented by virtual NIC emulators.

The virtualization software 705 manages the operations of the VMs 711-714, and includes several components for managing the access of the VMs 711-714 to the physical network 790 (by implementing the logical networks to which the VMs connect, in some embodiments). As illustrated, the virtualization software 705 includes several components, including a MPSE 720, a set of MPREs 730, a controller agent 740, a network data storage 745, a VTEP 750, and a set of uplink pipelines 770.

The VTEP (VXLAN tunnel endpoint) 750 allows the host machine 700 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM 711-714 on the host machine 700 sends a data packet (e.g., an Ethernet frame) to another VM in the same VXLAN network but on a different host (e.g., other machines 780) the VTEP 750 will encapsulate the data packet using the VXLAN network's VNI and network addresses of the VTEP 750, before sending the packet to the physical network 790. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 770.

The controller agent 740 receives control plane messages from a controller 760 (e.g., a CCP node) or a cluster of controllers. In some embodiments, these control plane messages include configuration data for configuring the various components of the virtualization software 705 (such as the MPSE 720 and the MPREs 730) and/or the virtual machines 711-9814. In the example illustrated in FIG. 7, the controller agent 740 receives control plane messages from the controller cluster 760 from the physical network 790 and in turn provides the received configuration data to the MPREs 730 through a control channel without going through the MPSE 720. However, in some embodiments, the controller agent 740 receives control plane messages from a direct data conduit (not illustrated) independent of the physical network 790. In some other embodiments, the controller agent 740 receives control plane messages from the MPSE 720 and forwards configuration data to the router 730 through the MPSE 720.

In some embodiments, the controller agent 740 receives the local CR and BS parameters from the CCP node and uses the received parameters to update a token bucket value locally. The host machine 700 may host multiple transport nodes of one or more logical network entities so may have multiple different token bucket values. For a transport node of a particular logical network entity (e.g., a MFE hosted by the host machine), the controller agent 740 controls the amount of data being processed by the transport node by (i) adding to the local token value of the transport node an amount of data allowed to be processed by the transport node during a monitoring interval based on the local CR and (ii) subtracting from the local token value of the transport node an amount of data already processed by the transport node. The amount of data allowed to be processed by the transport node is capped according to the local BS parameter.

The network data storage 745 in some embodiments stores some of the data that are used and produced by the logical forwarding elements of the host machine 700 (logical forwarding elements such as the MPSE 720 and the MPRE 730). Such stored data in some embodiments include forwarding tables and routing tables, connection mappings, as well as packet traffic statistics. These stored data are accessible by the controller agent 740 in some embodiments and delivered to another computing device (e.g., CCP node 600.)

The MPSE 720 delivers network data to and from the physical NIC 795, which interfaces the physical network 790. The MPSE 720 also includes a number of virtual ports (vPorts) that communicatively interconnect the physical NIC 795 with the VMs 711-714, the MPREs 730, and the controller agent 740. Each virtual port is associated with a unique L2 MAC address, in some embodiments. The MPSE 720 performs L2 link layer packet forwarding between any two network elements that are connected to its virtual ports. The MPSE 720 also performs L2 link layer packet forwarding between any network element connected to any one of its virtual ports and a reachable L2 network element on the physical network 790 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 730 perform L3 routing on data packets received from a virtual port on the MPSE 720. In some embodiments, this routing operation entails resolving a L3 IP address to a next-hop L2 MAC address and a next-hop VNI (i.e., the VNI of the next-hop's L2 segment). Each routed data packet is then sent back to the MPSE 720 to be forwarded to its destination according to the resolved L2 MAC address. This destination can be another VM connected to a virtual port on the MPSE 720, or a reachable L2 network element on the physical network 790 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching elements in order to distinguish from "logical" routing/switching elements, even though MPREs and MPSEs are implemented in software in some embodiments. In some embodiments, a MPRE is referred to as a "software router" and a MPSE is referred to as a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or a local MPSE running in each host machine.

In some embodiments, the MPRE 730 includes one or more logical interfaces (LIFs) that each serve as an interface to a particular segment (L2 segment or VXLAN) of the network. In some embodiments, each LIF is addressable by its own IP address and serves as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order to indicate in which host machine the MPRE operates.

The uplink module 770 relays data between the MPSE 720 and the physical NIC 795. The uplink module 770 includes an egress chain and an ingress chain that each perform a number of operations. Some of these operations are pre-processing and/or post-processing operations for the MPRE 730.

As illustrated by FIG. 7, the virtualization software 705 has multiple MPREs 730 for multiple, different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE, and hence a same L2 MAC address (vMAC or pMAC). In some other embodiments, each different MPRE belonging to a different tenant has its own port to the MPSE.

The MPSE 720 and the MPRE 730 make it possible for data packets to be forwarded amongst VMs 711-714 without being sent through the external physical network 790 (so long as the VMs connect to the same logical network, as different tenants' VMs will be isolated from each other). Specifically, the MPSE 720 performs the functions of the local logical switches by using the VNIs of the various L2 segments (i.e., their corresponding L2 logical switches) of the various logical networks. Likewise, the MPREs 730 perform the function of the logical routers by using the VNIs of those various L2 segments. Since each L2 segment/L2 switch has its own a unique VNI, the host machine 700 (and its virtualization software 705) is able to direct packets of different logical networks to their correct destinations and effectively segregate traffic of different logical networks from each other.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
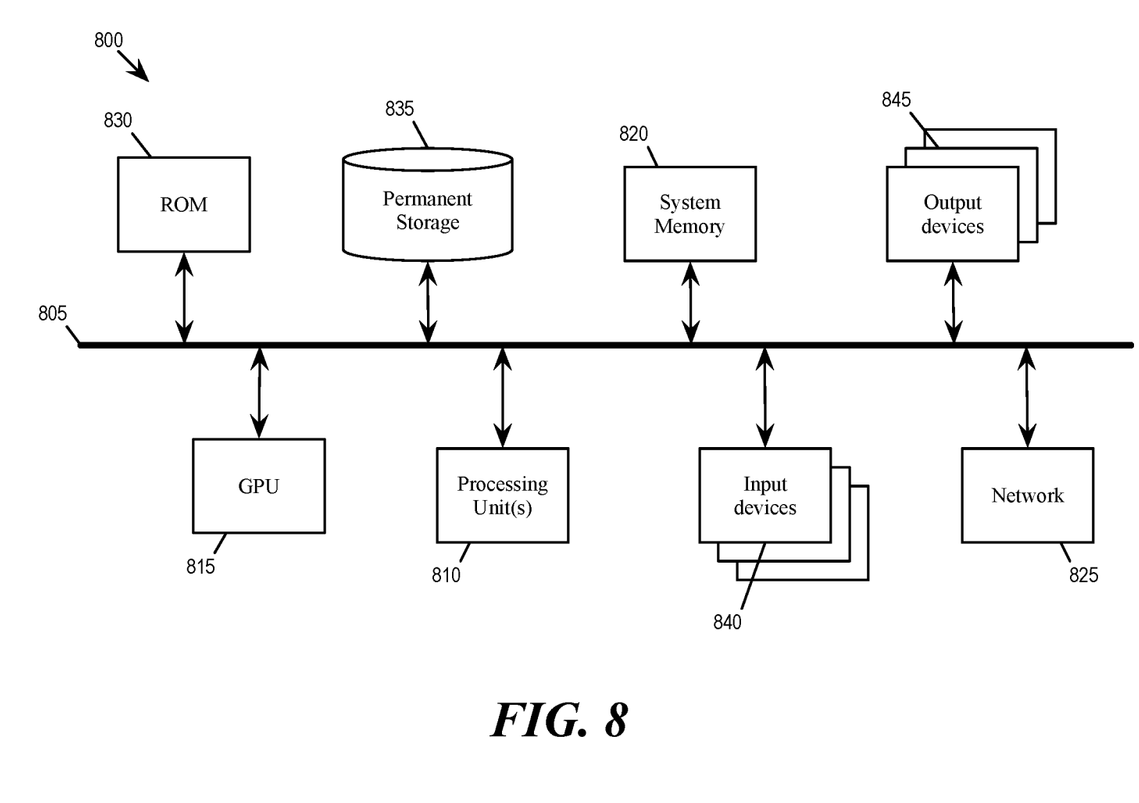

FIG. 8 conceptually illustrates a computer system 800 with which some embodiments of the invention are implemented. The computer system 800 can be used to implement any of the above-described hosts, controllers, and managers. As such, it can be used to execute any of the above-described processes. This computer system 800 includes various types of non-transitory machine-readable media and interfaces for various other types of machine-readable media. Computer system 800 includes a bus 805, processing unit(s) 810, a system memory 820, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 820, and the permanent storage device 835.

From these various memory units, the processing unit(s) 810 retrieve instructions to execute and data to process in order to execute the processes of the invention. The processing unit(s) 810 may be a single processor or a multi-core processor in different embodiments. The read-only-memory (ROM) 830 stores static data and instructions that are needed by the processing unit(s) 810 and other modules of the computer system 800. The permanent storage device 835, on the other hand, is a read-and-write memory device. This device 835 is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device 835. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor needs at runtime. In some embodiments, the invention's processes are stored in the system memory 820, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices 840 enable the user to communicate information and select commands to the computer system 800. The input devices 840 include alphanumeric keyboards and pointing devices (also called "cursor control devices"). The output devices 845 display images generated by the computer system 800. The output devices 845 include printers and display devices, such as cathode ray tubes (CRT) or liquid crystal displays (LCD). Some embodiments include devices such as a touchscreen that function as both input and output devices 840 and 845.

Finally, as shown in FIG. 8, bus 805 also couples computer system 800 to a network 865 through a network adapter (not shown). In this manner, the computer 800 can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
for a logical network entity in a logical network, specifying, at a computing device, a quality of service (QoS) requirement in terms of a committed rate (CR) parameter and a burst size (BS) parameter, the logical network entity comprising a plurality of transport nodes that process network traffic of the logical network entity;
monitoring traffic loads of the plurality of transport nodes of the logical network entity; and
allocating a local CR and a local BS to each of the plurality of transport nodes, wherein the local CR and the local BS are determined based on the CR and BS parameters of the logical network entity and based on the monitored traffic loads,
wherein each transport node of the logical network entity controls an amount of data being processed by the transport node based on a token bucket value that is computed based on the local CR and the local BS of the transport node.

2. The method of claim 1 further comprising allocating the CR and the BS of the logical network entity evenly among the transport nodes of the logical network entity prior to a time interval for monitoring the traffic loads at the plurality of transport nodes.

3. The method of claim 1, wherein a local token value of a transport node specifies a current amount of data that the transport node is capable of processing, wherein controlling the amount of data being processed by the transport node comprises:
adding to the local token value of the transport node an amount of data allowed to be processed by the transport node during a monitoring interval based on the local CR; and
subtracting from the local token value of the transport node an amount of data already processed by the transport node.

4. The method of claim 3, wherein the amount of data allowed to be processed by the transport node is capped according to the local BS.

5. The method of claim 1, further comprising maintaining a QoS data structure of the logical network entity, the QoS data structure comprising the CR and the BS of the logical network entity.

6. The method of claim 5, wherein the QoS data structure further comprises the local CR and the local BS of each transport node.

7. The method of claim 1, wherein the CR and the BS of the logical network entity are determined according to a QoS policy of the logical network entity.

8. The method of claim 1, wherein the logical network entity is in a virtualized shard based on a particular QoS class, wherein different virtualized shards support different QoS classes.

9. The method of claim 1, wherein monitoring the traffic load of the logical network entity comprises periodically collecting traffic load information from each transport node of the plurality of transport nodes.

10. The method of claim 1, wherein the plurality of transport nodes comprises one or more edge nodes for controlling network traffic to and from the logical network.

11. The method of claim 1, wherein the plurality of transport nodes comprises a plurality of managed forwarding elements in the logical network.

12. The method of claim 1, wherein the plurality of managed forwarding elements are implemented by virtualization software running in a plurality of different host computing devices.

13. The method of claim 12, wherein the plurality of different host computing devices comprises host computing devices in multiple different public cloud datacenters.

14. The method of claim 1, wherein the logical network spans multiple public cloud datacenters.

15. A system comprising:
a logical network entity in a logical network comprising a plurality of transport nodes that process network traffic of the logical network entity; and
a computing device implementing a central control plane (CCP) node of the logical network,
wherein the CCP node specifies a quality of service (QoS) requirement in terms of a committed rate (CR) parameter and a burst size (BS) parameter for a logical network entity,
wherein the CCP node monitors traffic loads of the plurality of transport nodes of the logical network entity,
wherein the CCP node allocates a local CR and a local BS to each of the plurality of transport nodes based on the CR and BS parameters of the logical network entity and the monitored traffic loads,
wherein each transport node of the logical network entity controls an amount of data being processed by the transport node based on a token bucket value that is computed based on the local CR and the local BS of the transport node.

16. The system of claim 15, wherein the CR and the BS of the logical network entity are allocated evenly among the transport nodes of the logical network entity prior to a time interval for monitoring the traffic loads at the plurality of transport nodes.

17. The system of claim 15, wherein a local token value of a transport node specifies a current amount of data that the transport node is capable of processing, wherein each transport node controls the amount of data being processed by the transport node by (i) adding to the local token value of the transport node an amount of data allowed to be processed by the transport node during a monitoring interval based on the local CR and (ii) subtracting from the local token value of the transport node an amount of data already processed by the transport node.

18. The system of claim 17, wherein the amount of data allowed to be processed by the transport node is capped according to the local BS.

19. A computing device comprising:
one or more processors; and
a computer-readable storage medium storing a plurality of computer-executable components that are executable by the one or more processors to perform a plurality of actions, the plurality of actions comprising:
specifying a quality of service (QoS) requirement in terms of a committed rate (CR) parameter and a burst size (BS) parameter for a logical network entity in a logical network, the logical network entity comprising a plurality of transport nodes that process network traffic of the logical network entity;
monitoring traffic loads of the plurality of transport nodes of the logical network entity; and
allocating a local CR and a local BS to each of the plurality of transport nodes, wherein the local CR and the local BS are determined based on the CR and BS parameters of the logical network entity and based on the monitored traffic loads,
wherein each transport node of the logical network entity controls an amount of data being processed by the transport node based on a token bucket value that is computed based on the local CR and the local BS of the transport node.

20. The computing device of claim 19, wherein the plurality of actions further comprise periodically collecting traffic load information from each transport node of the plurality of transport nodes.

* * * * *